US008803906B2

(12) United States Patent  
Chen et al.

(10) Patent No.: US 8,803,906 B2
(45) Date of Patent: Aug. 12, 2014

(54) METHOD AND SYSTEM FOR CONVERTING A 3D VIDEO WITH TARGETED ADVERTISEMENT INTO A 2D VIDEO FOR DISPLAY

(75) Inventors: Xuemin Chen, Rancho Santa Fe, CA (US); Samir Hulyalkar, Newtown, PA (US); Marcus Kellerman, San Diego, CA (US); Ilya Klebanov, Thornhill, CA (US)

(73) Assignee: Broadcom Corporation, Irvine, CA (US)

( * ) Notice: Subject to any disclaimer, the term of this patent is extended or adjusted under 35 U.S.C. 154(b) by 520 days.

(21) Appl. No.: 12/546,644

(22) Filed: Aug. 24, 2009

(65) Prior Publication Data

US 2011/0043524 A1 Feb. 24, 2011

(51) Int. Cl.
*G09G 5/00* (2006.01)
(52) U.S. Cl.
USPC ........... 345/619; 345/581; 345/629; 345/646; 725/42
(58) Field of Classification Search
USPC ..................... 725/34; 345/629; 340/995.1
See application file for complete search history.

(56) References Cited

U.S. PATENT DOCUMENTS

| 2003/0023981 | A1* | 1/2003 | Lemmons ............... 725/109 |
| 2004/0158858 | A1* | 8/2004 | Paxton et al. ............. 725/42 |
| 2005/0035883 | A1* | 2/2005 | Kameda et al. .......... 340/995.1 |
| 2007/0226761 | A1* | 9/2007 | Zalewski et al. ............. 725/32 |
| 2007/0247477 | A1* | 10/2007 | Lowry et al. ............. 345/629 |
| 2009/0172727 | A1* | 7/2009 | Baluja et al. ............. 725/34 |
| 2010/0095236 | A1* | 4/2010 | Silberstein et al. ......... 715/781 |

FOREIGN PATENT DOCUMENTS

WO     WO 01/82195     *  1/2001

* cited by examiner

*Primary Examiner* — Phi Hoang
(74) *Attorney, Agent, or Firm* — Foley & Lardner LLP

(57) ABSTRACT

A video receiver receives a compound transport stream (TS) comprising 3D program video streams and spliced advertising streams. The received one or more 3D program video streams are extracted and decoded. Targeted advertising streams are extracted from the received advertising streams according to user criteria. Targeted advertising graphic objects of the extracted or replaced targeted advertising streams are spliced into the decoded 3D program video streams. The decoded 3D program video with the spliced targeted advertising graphic objects is presented in a 2D video. The extracted or replaced targeted advertising streams are processed to generate the targeted advertising graphic objects to be spliced based on focal point of view. The generated targeted advertising graphic objects are located according to associated scene graph information. The decoded 3D program video streams and the spliced targeted advertising graphic objects are converted into a 2D video for display.

18 Claims, 5 Drawing Sheets

METHOD AND SYSTEM FOR CONVERTING A 3D VIDEO WITH TARGETED ADVERTISEMENT INTO A 2D VIDEO FOR DISPLAY

CROSS-REFERENCE TO RELATED APPLICATIONS/INCORPORATION BY REFERENCE

NOT APPLICABLE.

FIELD OF THE INVENTION

Certain embodiments of the invention relate to video processing. More specifically, certain embodiments of the invention relate to a method and system for converting a 3D video with targeted advertisement into a 2D video for display.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components, respectively.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for targeted advertising on 3D video, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for converting a 3D video with targeted advertisement into a 2D video for display. In various embodiments of the invention, a video receiver is operable to receive a compound stream, namely a transport stream. The received transport stream comprises 3D video streams of entertainment programs such as a 3D TV program, and a plurality of spliced advertising streams. The received one or more 3D program video streams may be extracted and decoded. The video receiver is operable to extract targeted advertising streams from the received plurality of spliced advertising streams according to user profile data indicating a users' taste and/or preferences with regard to advertising content. Depending on device configuration, the video receiver may be operable to select current targeted advertising streams for display according to corresponding priority levels. The video receiver may be operable to splice targeted advertising graphic objects from the current targeted advertising streams into the decoded one or more 3D program video streams. The video receiver may be operable to present the decoded 3D program video with the spliced targeted advertising graphic objects in a 2D video for display. The video receiver may be operable to locally process graphics for the current targeted advertising streams to generate one or more targeted advertising graphic objects. The video receiver may be operable to splice the generated targeted advertising graphic objects into the decoded one or more 3D program video streams based on focal point of view. The generated targeted advertising graphic objects may be 2D or 3D graphic objects. With 3D advertising graphic objects, associated scene graph information may be extracted from the received plurality of advertising streams. The video receiver may be operable to identify location information indicated in the extracted scene graph information to be used for locating the generated targeted advertising graphic objects in the decoded 3D program video streams. The video receiver may be operable to convert the decoded 3D program video streams and the spliced targeted advertising graphic objects into a 2D video for display.

Figure 1:
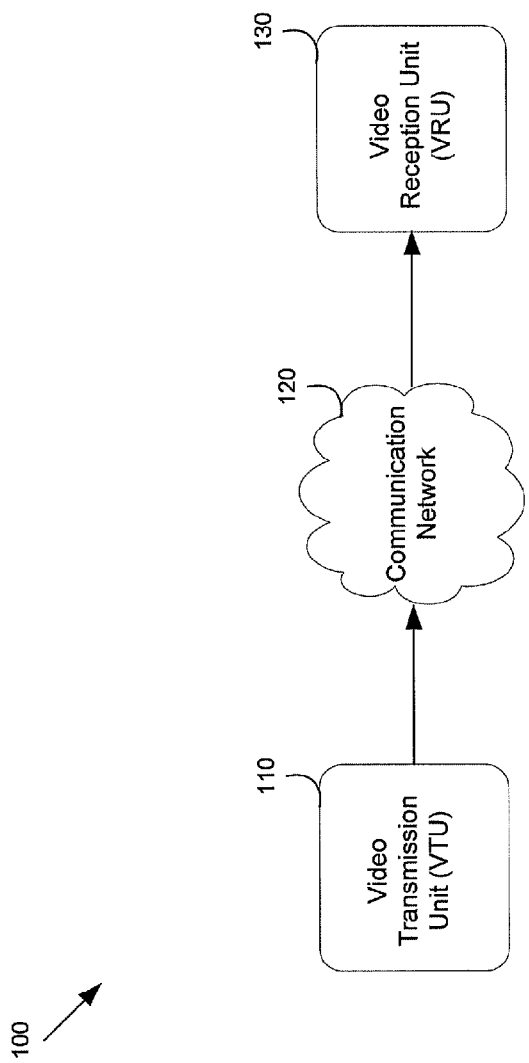
FIG. 1 is a block diagram of an exemplary video coding system that is operable to convert a 3D video with targeted advertisement into a 2D video for display, in accordance with an embodiment of the invention.

FIG. 1 is a block diagram of an exemplary video coding system that is operable to convert a 3D video with targeted advertisement into a 2D video for display, in accordance with an embodiment of the invention. Referring to FIG. 1, there is shown a video transmission unit (VTU) 110, a communication network 120, and a video reception unit (VRU) 130.

The VTU 110 may comprise suitable logic, circuitry, interfaces and/or code that may be operable to provide coded video content to the VRU 130. The VTU 110 may be operable to encode 3D video contents as well as 2D video contents depending on applications. In instances where a 3D video may be encoded, the VTU 110 may be operable to encode the 3D video as a left view video stream and a right view video stream, of which each may be transmitted in a different channel to the VRU 130. Video contents may be offered for entertainment programs, news programs and/or advertisement information. In this regard, ad splicing may be performed such that the VTU 110 may be operable to deliver entertainment programs and/or news programs to the VRU 130 together with targeted advertisement information. For example, the VTU 110 may be operable to insert the targeted advertisement information into contents of an entertainment program such as, for example, a 3D TV program. The VTU 110 may be operable to generate advertising streams for the targeted advertisement information. The generated advertising streams may be multiplexed with encoded 3D video streams of the 3D TV program to form a transport stream for transmission. The generated advertising streams may be 3D or 2D advertising streams. For example, 3D advertising streams may be 3D scene graph streams. A 3D scene graph may provide location information of associated graphics objects and/or indicate the focus in a corresponding video scene. Examples of the VTU 110 may comprise a cable television head-end, a direct broadcast satellite head-end, and a web server.

The communication network 120 may comprise suitable logic, circuitry, interfaces and/or code that may be operable to provide platforms for communication between the VTU 110 and the VRU 130. The communication network 120 may be implemented as a wired or wireless communication network. The communication network 120 may be local area network, wide area network, the Internet, and the like.

The VRU 130 may comprise suitable logic, circuitry, interfaces and/or code that may be operable to receive a transport stream from the VTU 110 over the communication network 120. The received transport stream may comprise coded 3D video streams of entertainment programs such as, for example, a 3D TV. The received transport stream may also comprise spliced targeted advertising streams of, for example, commercials. In this regard, the VRU 130 may be operable to demultiplex or parse the received transport stream based on user profile. For example, the coded 3D video streams of the 3D TV program and the spliced targeted advertising streams may be extracted from the received transport stream and store in a memory or a local storage of VRU 130. The VRU 130 may be operable to decode the extracted coded 3D video streams of the 3D TV program for display. Depending on user profile and/or device configuration, the extracted targeted advertising streams may be presented in the associated 3D TV program or removed from the associated 3D TV program for display according to corresponding priority levels such as advertisement cost rates. A targeted advertisement with a higher priority level may be selected as the current targeted advertisement for display in the 3D TV program. For example, the spliced targeted advertising streams in the received transport stream of the 3D TV program may represent a Pepsi advertisement such as a Pepsi can. A Coke advertisement with a higher priority level may be received separately. The spliced targeted advertising streams for Pepsi in the 3D TV program may be removed and replaced by corresponding targeted advertising streams for Coke as the current targeted advertising streams in the 3D TV program for display. The current targeted advertising streams may be graphically processed locally to produce corresponding current targeted advertising graphic objects. The current targeted advertising graphic objects may be located according to location information indicated in associated 3D scene graph. The current targeted advertising graphic objects may be spliced into the decoded 3D video streams of the 3D TV program. The VRU 130 may be operable to convert resulting compound 3D video into a 2D video for display. Examples of the VRUs 130 through 150 may comprise set-top boxes, personal computers, and the like.

In an exemplary operation, the VTU 110 may be operable to encode video contents such as 3D video contents of an entertainment program such as a 3D TV program into a left view video stream and a right view video stream. Targeted advertisement information may be inserted into the coded 3D video contents of the 3D TV program to form a transport stream for transmission. The transport stream may be communicated with the VRU 130 over the communication network 120. The VRU 130 may be operable to demultiplex the received transport stream into coded 3D video streams of the 3D TV program and advertising streams. The VRU 130 may be operable to decode the coded 3D video streams of the 3D TV program for display. Targeted advertising streams may be extracted based on, for example, user profile information and/or device information, from the coded 3D video streams of the 3D TV program. Depending on device configuration, the extracted targeted advertising streams may be presented in the 3D TV program or removed from the 3D TV program for display according to corresponding priority levels. A targeted advertisement with a higher priority level may be selected as a current targeted advertisement for display in the 3D TV program. The VRU 130 may be operable to locally process graphics for the selected current targeted advertising streams to produce corresponding current targeted advertising graphic objects. The current targeted advertising graphic objects may be located according to timing information indicated in associated 3D scene graph. The VRU 130 may be operable to splice the current targeted advertising graphic objects into the decoded 3D video based on the focal point of view. The resulting compound 3D video may be converted into a 2D video for display.

Figure 2:
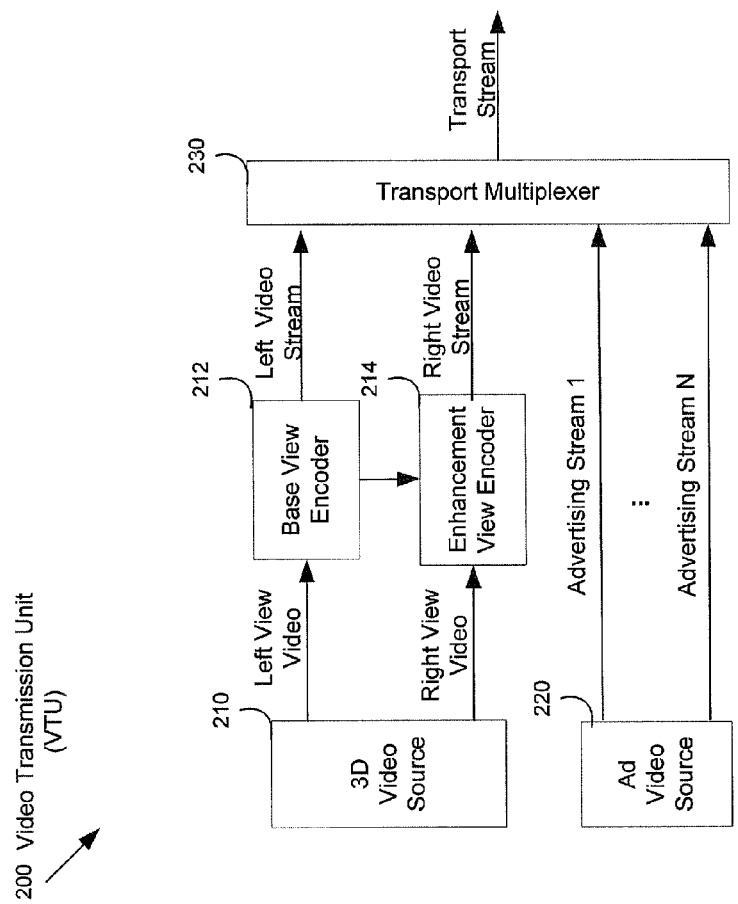
FIG. 2 is a diagram illustrating an exemplary video transmission unit that is operable to perform ad splicing, in accordance with an embodiment of the invention.

FIG. 2 is a diagram illustrating an exemplary video transmission unit that is operable to perform ad splicing, in accordance with an embodiment of the invention. Referring to FIG. 2, there is shown a video transmission unit (VTU) 200. The VTU comprises a 3D video source 210, a base view encoder 212, an enhancement view encoder 214, an ad video source 220, and a transport multiplexer 230.

The 3D video source 210 may comprise suitable logic, circuitry, interfaces and/or code that may be operable to capture source 3D video contents. The 3D video source 210 may be operable to generate a left view video and a right view video from the captured source 3D video contents. The left view video and the right view video may be communicated with the base view encoder 214 and, for example, the enhancement view encoder 216, respectively, for video compressing.

The base view encoder 214 may comprise suitable logic, circuitry, interfaces and/or code that may be operable to encode the left view video from the 3D video source 210 frame by frame. The base view encoder 214 may be operable to utilize various video compression algorithms such as specified in MPEG-2, MPEG-4, AVC, VC1, VP6, and/or other video formats to form compressed or coded video contents for the left view video from the 3D video source 210. Information such as the scene information from base view coding may be communicated with the enhancement view encoder 216 to be used for enhancement view coding.

The enhancement view encoder 216 may comprise suitable logic, circuitry, interfaces and/or code that may be operable to encode the right view video from the 3D video source 210 frame by frame. The enhancement view encoder 216 may be operable to utilize various video compression algorithms such as specified in MPEG-2, MPEG-4, AVC, VC1, VP6, and/or other video formats to form compressed or coded video content for the right view video from the 3D video source 210.

The advertisement source 220 may comprise suitable logic, circuitry, interfaces and/or code that may be operable to capture source advertisement contents. The advertisement source 220 may be operable to provide available advertisement video contents for potential ad splicing. The advertisement source 220 may be operable to communicate available advertisement video contents via a plurality of advertising streams. The plurality of advertising streams may be inserted into potential gaps within the base video stream and/or the enhancement video stream from the base view encoder 214 and the enhancement encoder 216, respectively. Contents of the plurality of advertising streams may comprise 3D advertising contents and/or 2D advertising contents.

The transport multiplexer 230 may comprise suitable logic, circuitry, interfaces and/or code that may be operable to merge a plurality of video streams into a single compound video stream, namely a transport stream (TS), for transmission. The TS may comprise the base view stream, the enhancement view stream and spliced advertising streams.

Although a single enhancement view encoder 214 is illustrated in FIG. 2, the invention may not be so limited. Accordingly, any number of enhancement view video encoders may be used for processing the left view video and the right view video generated by the 3D video source 210 without departing from the spirit and scope of various embodiments of the invention.

In an exemplary operation, the 3D video source 210 may be operable to capture source 3D video contents to produce a left view video and a right view video for video compression. The left view video may be encoded via the base view encoder 214 producing a base view stream. The right view video may be encoded via the enhancement view encoder 216 producing an enhancement view stream. The base view encoder 214 may be operable to provide information such as the scene information to the enhancement view encoder 216 for enhancement view coding. One or more advertising streams from the advertisement source 220 may be multiplexed with the base view stream and/or the enhancement view stream to form a transport stream by the transport multiplexer 230. The resulting transport stream may be communicated to the VRU 130 to support corresponding services.

Figure 3:
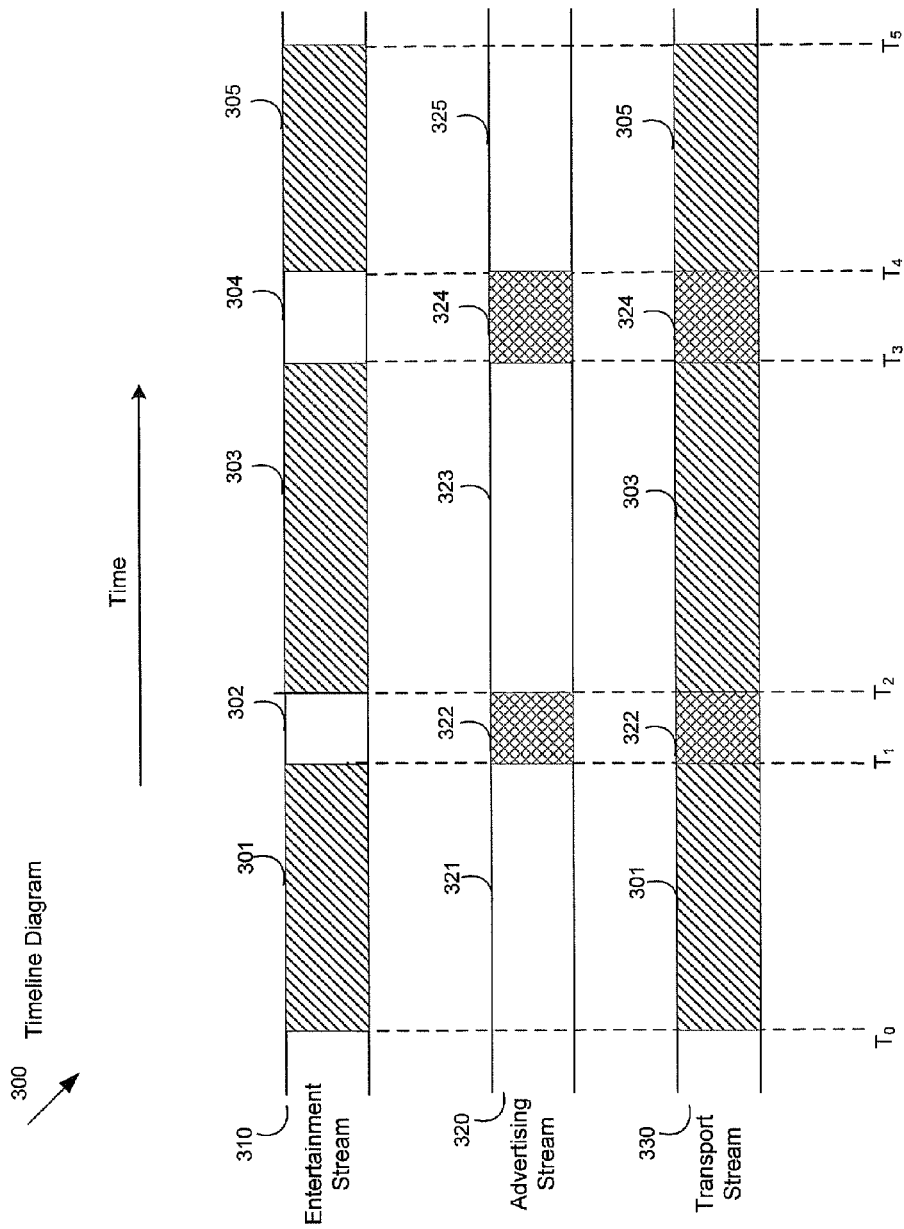
FIG. 3 is a timeline diagram illustrating an exemplary composition of a transport stream, in accordance with an embodiment of the invention.

FIG. 3 is a timeline diagram illustrating an exemplary composition of a transport stream, in accordance with an embodiment of the invention. Referring to FIG. 3, there is shown a timeline diagram 300. The timeline diagram 300 comprises an entertainment stream 310, an advertising stream 320, and a transport stream 330. The entertainment stream 310 comprises entertainment content portions 301, 303 and 305 separated by entertainment gaps 302 and 304. The entertainment gaps 302 and 304 may indicate available periods in the entertainment stream 310 where advertisement contents may be spliced or inserted. The advertising stream 320 may comprise advertisement content portions 322 and 324 separated by advertising gaps 321, 323 and 325. The advertising gaps 321, 323 and 325 may indicate time periods between advertisement content portions. Each of the resulting content portions such as, for example, the entertainment content portion 301 and/or the advertisement content portion 322 may be synchronized according to a clock time associated with the advertising stream 320 or the entertainment stream 310 so that assembly of the constituent parts of the resulting transport stream 330 may be chronologically ordered. The transport stream 330 comprises entertainment content portions 301, 303 and 305, and spliced or inserted advertisement content portions 322 and 324.

Figure 4:
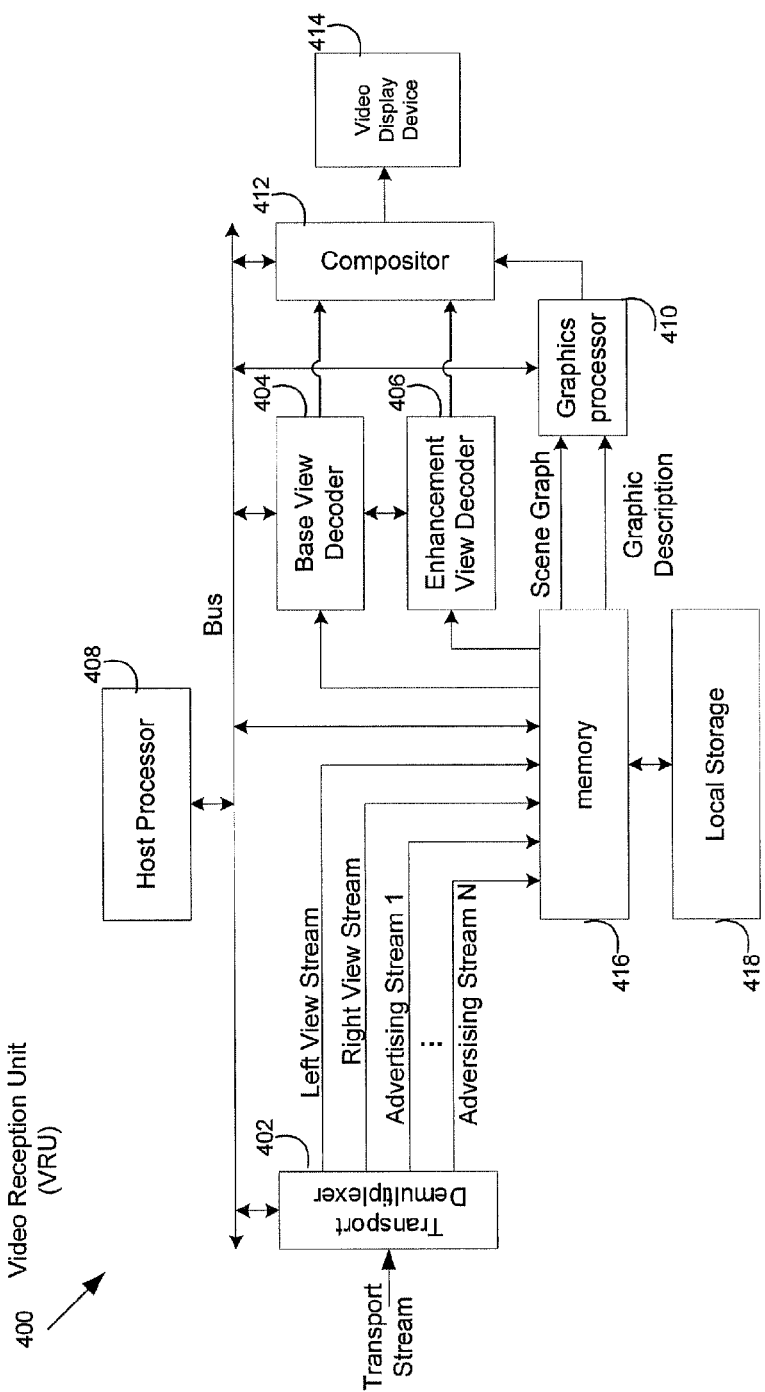
FIG. 4 is a diagram illustrating an exemplary video reception unit that is operable to splice targeted advertisement in a received 3D video prior to a 2D display, in accordance with an embodiment of the invention.

FIG. 4 is a diagram illustrating an exemplary video reception unit that is operable to splice targeted advertisement in a received 3D video prior to a 2D display, in accordance with an embodiment of the invention. Referring to FIG. 4, there is shown a video reception unit (VRU) 400. The VRU 400 comprises a transport demultiplexer 402, a base view decoder 404, an enhancement view decoder 406, a host processor 408, a graphics processor 410, a compositor 412, a video display device 414, a memory 416, and a local storage 418.

The transport demultiplexer 402 may comprise suitable logic, circuitry, interfaces and/or code that may be operable to demultiplex or parse a transport stream received from the VTU 110, for example. The received transport stream is a compound stream comprising a plurality of streams such as, for example, a base view stream, an enhancement view stream, and multiple advertising streams. The multiple advertising streams may comprise 3D advertisement and/or 2D advertisement. The transport demultiplexer 230 may be operable to extract decodable video streams such as the base view stream and the enhancement view stream to the memory 416 and/or the local storage 418. For example, in instances where a legacy mono video decoder may be used at the VRU 400, only the base view may be extracted. In addition, targeted advertising streams and associated scene graphs may be extracted to the memory 416 and/or the local storage 418 according to user profile. The extracted targeted advertising streams may play back from the memory 416 and/or the local storage 418 for ad superimposing and replacement.

The base view decoder 404 may comprise suitable logic, circuitry, interfaces and/or code that may be operable to decode a received left view video from the VTU 110 frame by frame. The base view decoder 404 may be operable to utilize various video decompression algorithms such as specified in MPEG-2, MPEG-4, AVC, VC1, VP6, and/or other video formats to form decompressed or decoded video contents for the received left view video from the VTU 110. Information such as the scene information from base view decoding may be communicated with the enhancement view decoder 406 to be used for enhancement view decoding.

The enhancement view decoder 406 may comprise suitable logic, circuitry, interfaces and/or code that may be operable to decode a right view video from the VTU 110 frame by frame. The enhancement view decoder 406 may be operable to utilize various video decompression algorithms such as specified in MPEG-2, MPEG-4, AVC, VC1, VP6, and/or other video formats to form decompressed or decoded video contents for the received right view video from the VTU 110.

The host processor 408 may comprise suitable logic, circuitry, interfaces and/or code that may be operable to manipulate and control operations of associated units such as, for example, the transport demultiplexer 402 and/or the graphics processor 410, for example, to support various applications such as, for example, 3D video streaming on the VRU 400. The host processor 408 may be operable to communicate with the memory 418 and/or the local storage 418 to process scene graph streams of targeted advertisement. The host processor 408 may be operable to communicate the processed scene graph to the graphics processor 410 for setting up video graphic object superimposing and replacement. In this regard, the host processor 408 may be configured to select a targeted advertisement with a higher priority level as a current targeted advertisement for display in the 3D TV program. The graphics processor 410 may comprise suitable logic, circuitry, interfaces and/or code that may be operable to perform graphic processing on scene graph of the current targeted advertising streams based on the focal point of view. The graphics processor 410 may be operable to generate corresponding advertising graphic objects of the current targeted advertising streams. The current advertising graphic objects may be generated based on the focal point of view and/or the last view of a served entertainment program. The generated advertising graphic objects may be located according to location information indicated in the scene graph of targeted advertising streams. The generated advertising graphic objects may comprise 3D and/or 2D graphic objects. The generated advertising graphic objects may be communicated with the compositor 412 for ad splicing.

The compositor 412 may comprise suitable logic, circuitry, interfaces and/or code that may be operable to splice the generated advertising graphic objects from the graphics processor 410 in 3D video contents of entertainment programs such as a 3D TV program. The compositor 412 may be operable to convert the 3D video contents with the spliced advertising objects into a 2D video for display on the video display device 414.

The video display device 414 may comprise suitable logic, circuitry, and/or code that may be operable to display 2D video frames received from the compositor 412.

The memory 416 may comprise suitable logic, circuitry, interfaces and/or code that may be operable to store information such as executable instructions and data that may be utilized by the VRU 400. The executable instructions may comprise various image processing algorithms that may be utilized to process decoded video contents by the base view decoder 404 and the enhancement view decoder 406. The executable instructions may comprise graphics processing algorithms that may be utilized by the graphics processor 410 to generate advertising graphic objects from associated scene graph of targeted advertisement. The data may comprise received transport stream data, decoded video contents, and scene graph of targeted advertisement. The memory 416 may comprise RAM, ROM, low latency nonvolatile memory such as flash memory and/or other suitable electronic data storage.

The local storage 418 may comprise suitable logic, circuitry, interfaces and/or code that may be operable to record and store preferred contents of video applications. The local storage 418 is an optional component for the VRU 400. The local storage 418 may comprise magneto- and/or optical drives such as a hard disk. The local storage 418 may also comprise solid state memory such as flash memory and/or other suitable electronic data storage capable of recording and storing data and instructions.

In operation, the transport demultiplexer 402 may be operable to receive a transport stream from the VTU 110, for example. The received transport stream comprises 3D video streams such as a base view stream and an enhancement view stream of entertainment programs such as a 3D TV program and spliced advertising streams. The transport demultiplexer 402 may be operable to demultiplex or parse the received transport stream into the base view stream, the enhancement view stream, and the spliced advertising streams. The base view stream and the enhancement view stream may be extracted for video decoding via the base view decoder 404 and the enhancement view decoder 406, respectively. Targeted advertising streams and associated scene graph may be extracted from the received spliced advertising streams. The host processor 408 may process the extracted scene graph for setting up video graphic object superimposing and replacement. A targeted advertisement with a higher priority level may be selected as a current targeted advertisement for display in the 3D TV program. The graphics processor 410 may be operable to generate advertising graphic objects of the selected current targeted advertising streams. The compositor 412 may be operable to splice or place the generated advertising graphic objects in the decoded 3D video contents of the 3D TV program. The compositor 412 may be operable to convert the resulting 3D video contents with the spliced advertising graphic objects into a 2D video for display on the video display device 414.

Figure 5:
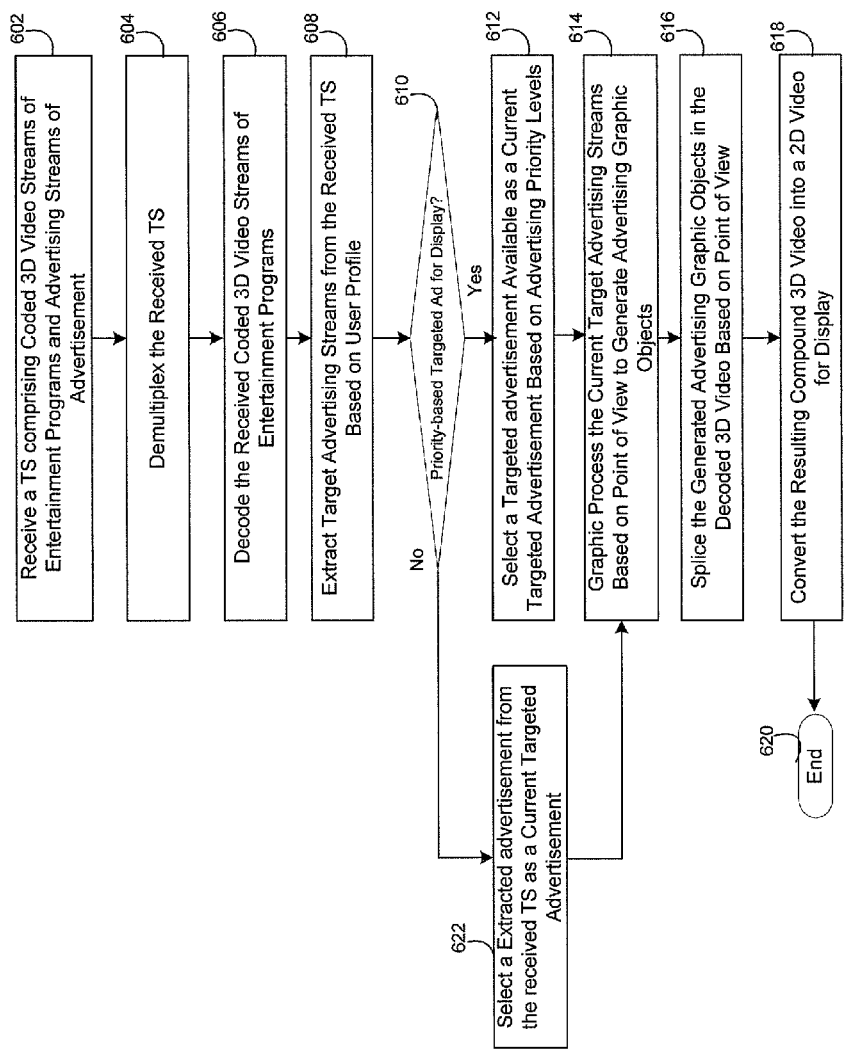
FIG. 5 is a flow chart illustrating exemplary steps for presenting a received 3D entertainment video with targeted advertisements on a 2D display, in accordance with an embodiment of the invention.

FIG. 5 is a flow chart illustrating exemplary steps for presenting a received 3D entertainment video with targeted advertisements on a 2D display, in accordance with an embodiment of the invention. Referring to FIG. 5, the exemplary steps start with step 502, where the VRU 120 may be operable to receive a transport stream (TS) from the VTU 110. The received TS comprises coded 3D video streams of entertainment programs such as a 3D TV program and advertising streams such as scene graph streams. In step 604, the VRU 120 may be operable to demultiplex the received TS into the coded 3D video streams of the 3D TV program and the advertising streams. In step 606, the VRU 120 may be operable to extract the received coded 3D video streams and decode the extracted coded 3D video streams of the 3D TV program. In step 608, the VRU 120 may be operable to extract targeted advertising streams from the received TS based on user profile. The user profile may comprise information such as personal tastes and preferences so that the users may be better satisfied with received ads. In step 610, it may be determined that whether a priority-based targeted advertisement is needed for display. In instances where a priority-based targeted advertisement is needed for display, then in step 612, where the VRU 120 may be operable to select a targeted advertisement available as a current targeted advertisement for display in the 3D TV program based on corresponding priority levels. In step 614, the VRU 120 may be operable to graphic process the current targeted advertising streams based on focal point of view to generate advertising graphic objects. In step 616, the VRU 120 may be operable to splice the generated advertising graphic objects in the decoded 3D Video based on focal point of view. In step 618, the VRU 120 may be operable to convert the resulting compound 3D video into a 2D video for display on the video display device 414. The exemplary steps may end at step 620.

In step 610, in instances where a priority-based targeted advertisement is not needed for display, then in step 622, where the VRU 120 may be operable to select the targeted advertising streams extracted from the received TS of the 3D TV program as a current targeted advertisement for display in the 3D TV program. The exemplary steps may continue in step 614.

Aspects of a method and system for converting a 3D video with targeted advertisement into a 2D video for display are provided. In accordance with various embodiments of the invention, a video receiver such as the VRU 400 may be operable to receive a compound stream, namely a transport stream, from the VTU 110, for example. The received transport stream comprises 3D video streams of entertainment programs such as a 3D TV program, and a plurality of spliced advertising streams. The received one or more 3D program video streams may be extracted via the transport demultiplexer 402 and decoded via, for example, the base view decoder 404 and/or the enhancement view decoder 406, respectively. The VRU 400 may be operable to extract targeted advertising streams from the received plurality of spliced advertising streams according to one or more user criteria indicating users' personal taste and/or preferences with regard to advertising contents. Depending on device configuration, the extracted targeted advertising streams may be replaced by higher priority targeted advertisements available as a current targeted advertisement for display in the 3D TV program. The graphics processor 410 may be operable to splice targeted advertising graphic objects of the current targeted advertising streams into the decoded 3D program video streams. The compositor 412 may be operable to present the decoded 3D program video with the spliced targeted advertising graphic objects in a 2D video to be displayed on the video display device 414. The host processor 408 may be operable to process the current targeted advertising streams and communicate with the graphics processor 410 to locally process graphics for the current targeted advertising streams.

The graphics processor 410 may be operable to generate targeted advertising graphic objects with completing the graphic processing. The compositor 412 may be operable to splice the generated targeted advertising graphic objects into the decoded 3D program video streams based on focal point of view. The generated targeted advertising graphic objects may be 2D or 3D graphic objects. In instances where the generated targeted advertising graphic objects may be 3D graphic objects, associated scene graph information may be extracted from the received plurality of advertising streams. The graphics processor 410 may be operable to identify location information indicated in the extracted scene graph information. The identified location information may be communicated with the compositor 412 to locate the generated targeted advertising graphic objects in the decoded 3D program video streams. The compositor 412 may be operable to convert the decoded 3D program video streams and the spliced targeted advertising graphic objects into a 2D video to be displayed on the video display device 414.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for converting a 3D video with targeted advertisement into a 2D video for display.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for performing video coding by one or more processors or circuits in a video processing system, the method comprising:
   receiving a compound transport stream, the compound transport stream comprising 3D program video streams, the compound transport stream further comprising scene graph advertising streams;
   decoding the 3D program video streams;
   extracting targeted scene graph advertising streams from the scene graph advertising streams based on user criteria;
   graphically processing the targeted scene graph advertising streams to produce targeted advertising graphic objects;
   extracting scene graph information from the received compound transport stream, the scene graph information comprising a 3D scene graph of the targeted scene graph advertising streams; and
   splicing the targeted advertising graphic objects for the extracted targeted scene graph advertising streams into the decoded 3D program video streams for a 2D presentation at one or more locations indicated in the 3D scene graph of the targeted scene graph advertising streams.

2. The method according to claim 1, comprising replacing the extracted targeted scene graph advertising streams by available higher priority targeted scene graph advertising streams prior to the graphic processing.

3. The method according to claim 1, wherein the targeted advertising graphic objects are spliced into the decoded 3D program video streams based on focal point of view indicated by the targeted scene graph.

4. The method according to claim 1, wherein the targeted advertising graphic objects are 3D graphic objects.

5. The method according to claim 1, comprising identifying location information indicated by the extracted scene graph information.

6. The method according to claim 1, comprising converting the decoded 3D program video streams and the spliced targeted advertising graphic objects into a 2D video for display.

7. The method according to claim 1, wherein the targeted advertising graphic objects are 2D graphic objects.

8. The method according to claim 1, further comprising communicating the scene graph to a graphics processor for setting up video graphic object superimposing and replacement.

9. The method according to claim 1, wherein the targeted scene graph advertising streams are selected over other available scene graph advertising streams based on the user criteria, wherein the targeted scene graph advertising streams and the other available scene graph advertising streams are included in the compound transport stream.

10. A system for performing video coding, the system comprising:
   a demultiplexer to receive a compound transport stream, the compound transport stream comprising 3D program video streams, the compound transport stream further comprising scene graph advertising streams, the demultiplexer further to extract targeted scene graph advertising streams from the scene graph advertising streams based on user criteria;
   a decoder to decode the 3D program video streams;

a graphics processor to process the targeted scene graph advertising streams to generate targeted advertising graphic objects;

the graphics processor further operable to extract scene graph information from the received compound transport stream, the scene graph information comprising a 3D scene graph of the targeted scene graph advertising streams; and a compositor to splice the targeted advertising graphic objects for the extracted targeted scene graph advertising streams into the decoded 3D program video streams for a 2D presentation at one or more locations indicated in the 3D scene graph of the targeted scene graph advertising streams.

11. The system of claim 10, further comprising a host processor to replace the extracted targeted scene graph advertising streams by available higher priority targeted scene graph advertising streams prior to the graphic processing.

12. The system of claim 10, wherein the generated targeted advertising graphic objects are spliced into the decoded 3D program video streams based on focal point of view indicated by the targeted scene graph.

13. The system of claim 10, wherein the generated targeted advertising graphic objects comprise 3D graphic objects.

14. The system of claim 10, wherein the graphics processor is further operable to identify location information indicated by the extracted scene graph information.

15. The system of claim 10, wherein the graphics processor is further operable to convert the decoded 3D program video streams and the spliced targeted advertising graphic objects into a 2D video for display.

16. The system according to claim 10, wherein the generated targeted advertising graphic objects are 2D graphic objects.

17. The system according to claim 10, further comprising a host processor to communicate the scene graph to the graphics processor for setting up video graphic object superimposing and replacement.

18. The system according to claim 10, wherein the targeted scene graph advertising streams are selected over other available scene graph advertising streams based on the user criteria, wherein the targeted scene graph advertising streams and the other available scene graph advertising streams are included in the compound transport stream.

* * * * *